(12) United States Patent
Romano et al.

(10) Patent No.: US 11,900,943 B2
(45) Date of Patent: *Feb. 13, 2024

(54) SYSTEM AND METHOD OF TEXT ZONING

(71) Applicant: Verint Systems Ltd., Herzilya Pituach (IL)

(72) Inventors: Roni Romano, Even Yehuda (IL); Yair Horesh, Herzilya Pituach (IL); Jeremie Dreyfuss, Herzilya Pituach (IL)

(73) Assignee: Verint Systems Ltd., Herzilya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,491

(22) Filed: Jan. 3, 2022

(65) Prior Publication Data
US 2022/0122609 A1 Apr. 21, 2022

Related U.S. Application Data

(63) Continuation of application No. 16/553,451, filed on Aug. 28, 2019, now Pat. No. 11,217,252, which is a continuation of application No. 14/467,783, filed on Aug. 25, 2014, now abandoned.

(60) Provisional application No. 61/872,224, filed on Aug. 30, 2013.

(51) Int. Cl.
*G10L 15/26* (2006.01)
*G10L 15/18* (2013.01)
*G10L 15/04* (2013.01)

(52) U.S. Cl.
CPC .............. *G10L 15/26* (2013.01); *G10L 15/04* (2013.01); *G10L 15/18* (2013.01); *G10L 15/1822* (2013.01)

(58) Field of Classification Search
None
See application file for complete search history.

(56) References Cited

U.S. PATENT DOCUMENTS

| 6,385,579 | B1 | 5/2002 | Padmanabhan et al. |
| 6,542,866 | B1* | 4/2003 | Jiang ........................ G10L 15/02 704/256.4 |
| 2006/0149558 | A1* | 7/2006 | Kahn ...................... G10L 15/063 704/278 |
| 2007/0250318 | A1* | 10/2007 | Waserblat ............... G10L 15/07 704/236 |
| 2008/0221882 | A1* | 9/2008 | Bundock .................. G10L 15/26 704/235 |

(Continued)

OTHER PUBLICATIONS

Heidi Christensen, BalaKrishna Kolluru, Yoshihiko Gotoh, Steve Rena; Maximum entropy segmentation of broadcast news; Mar. 2005; URL: https://ieeexplore.ieee.org/document/1415292?source=IQplus (Year: 2005).*

(Continued)

*Primary Examiner* — Richa Mishra
(74) *Attorney, Agent, or Firm* — Meunier Carlin & Curfman LLC

(57) ABSTRACT

A method of zoning a transcription of audio data includes separating the transcription of audio data into a plurality of utterances. A that each word in an utterances is a meaning unit boundary is calculated. The utterance is split into two new utterances at a work with a maximum calculated probability. At least one of the two new utterances that is shorter than a maximum utterance threshold is identified as a meaning unit.

24 Claims, 3 Drawing Sheets

(56) References Cited

U.S. PATENT DOCUMENTS

| | | | |
|---|---|---|---|
| 2010/0131260 A1* | 5/2010 | Bangalore | G06F 40/58 |
| | | | 704/3 |
| 2011/0066434 A1* | 3/2011 | Li | G10L 15/10 |
| | | | 704/E21.001 |
| 2012/0016671 A1* | 1/2012 | Jaggi | G10L 15/22 |
| | | | 704/235 |
| 2012/0131031 A1 | 5/2012 | Xie et al. | |
| 2015/0032746 A1 | 1/2015 | Lev-Tov et al. | |

OTHER PUBLICATIONS

Notice of Allowance issued in U.S. Appl. No. 17/225,589 dated Jan. 12, 2023, 10 pages.

Galescu et al., "Bi-directional conversion between graphemes and phenomes using a joint n-gram model", 2001, In 4th ISCA Tutorial and Research Workshop (ITRW) on Speech Synthesis 2001, pp. 1-6.

Saon et al., "Data-driven approach to designing compound words for continuous speech recognition.", 2001 EEE transactions on Speech and audio processing. May 2001;9(4):327-32.

\* cited by examiner

SYSTEM AND METHOD OF TEXT ZONING

CROSS-REFERENCE TO RELATED APPLICATION

This present application is a continuation application of U.S. patent application Ser. No. 16/553,451, filed Aug. 28, 2019, now U.S. Pat. No. 11,217,252, which is a continuation application of U.S. patent application Ser. No. 14/467,783, filed Aug. 25, 2014, abandoned, which claims the benefit of U.S. Provisional Application No. 61/872,224 filed on Aug. 30, 2013, the contents of which are incorporated herein by reference in their entirety.

BACKGROUND

In the case of automated transcription of audio data often the output transcription in likely in the form of a single text file. In many instances, the audio data in fact contains a conversation between multiple speakers. Even within a case of a single speaker, automated transcriptions will be devoid of punctuation. These natural events provide context for analysis of the content of the transcription. Without such natural cues to provide context, meaningful analysis may be difficult and inaccurate. Therefore it is desirable for an automated system and method automatedly zone or segment the transcription file.

BRIEF DISCLOSURE

A method of zoning a transcription of auto data includes separating the transcription of auto data into a plurality of utterances. Utterances of the plurality of utterances that are shorter then a predetermined minimum threshold are identified as meaning units. A probability is calculated that each word in an utterance of the plurality of utterances which are longer than the predetermined minimum threshold is a meaning unit boundary. The utterance of the plurality of utterances which is longer than the predetermined minimum threshold is split into two new utterances at a word with a maximum calculated probability. At least one of the two utterances that is shorter than a maximum utterance threshold is identified as a meaning unit.

In an additional exemplary embodiment of a method of zoning a transcription of auto data, the transcription of auto data is separated into a plurality of utterances. Utterances of the plurality that are shorter than a predetermined minimum threshold are identified as meaning units. Utterances of the plurality of utterances that are longer than the predetermined minimum threshold are selected for subdivision. The selected utterances are split into windows. Each window is twice a maximum utterance threshold. A probability that each word in the plurality of windows is a meaning unit boundary is calculated based upon at least a linguistic model applied to each of the plurality of windows. The selected utterances which are longer than the predetermined minimum threshold are split into two new utterances at a word with a maximum calculated probability. At least one of the two new utterances that is shorter than a maximum utterance threshold is identified as a meaning unit.

DETAILED DISCLOSURE

Meaning units are effectively the building blocks of a specific speech, interaction, or disclosure. A meaning unit can be considered to be a realization of an illocutionary force (intent), a conceptual content, a syntactic dependency (grammatical relation), and a prosodic contour. Zoning of a transcript as disclosed herein, seeks to find optimal positions of boundaries between meaning units within the transcript. In an embodiment, the transcript is an automated transcription of audio data. Embodiments as disclosed herein have been found to be more accurate in automatedly zoning transcripts. More accurate identification of meaning units both makes: later analysis and analytics of the meaning units less computationally demanding and produces more accurate and meaningful results because appropriate context is available more frequently.

Figure 3:
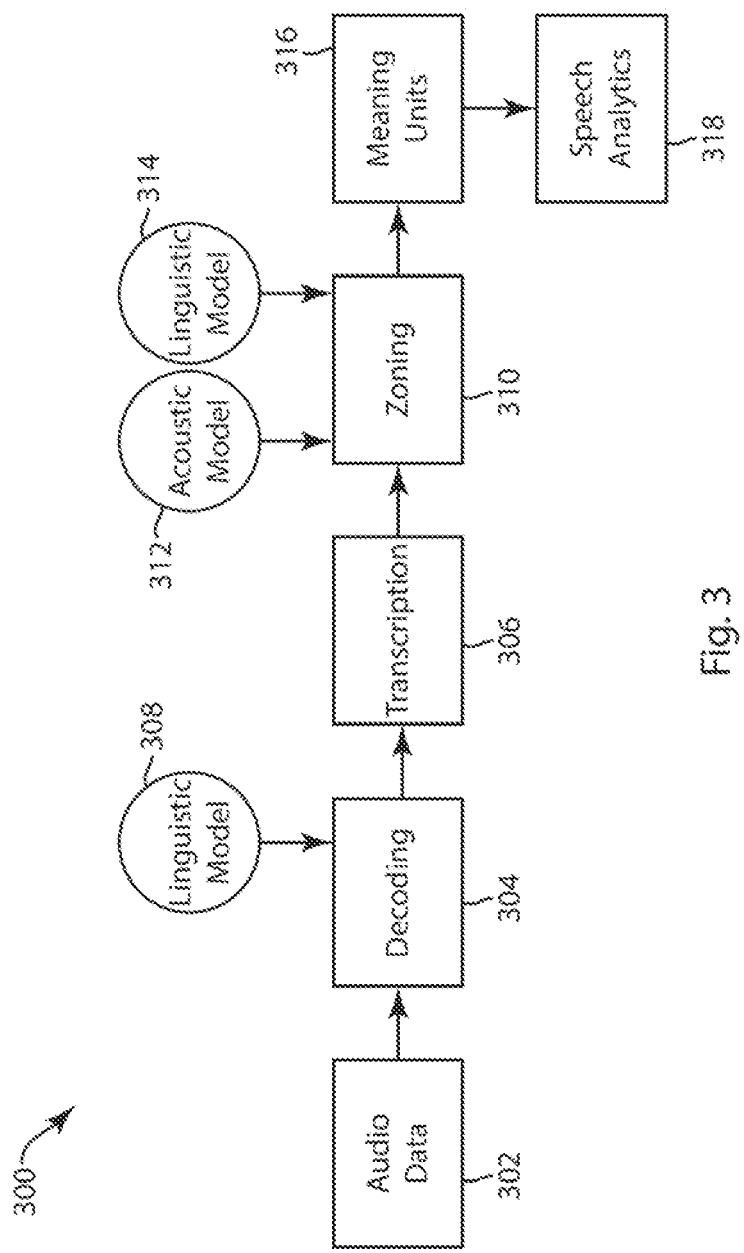
FIG. 3 is a flow chart that depicts an exemplary embodiment of a method of analytics of a textually zoned transcription.

Referring first to FIG. 3, FIG. 3 is a flow chart that depicts an exemplary embodiment of a method 300 of audio data analysis. The method 300 begins with audio data that is obtained at 302. The audio data at 302 may exemplarily be a .WAV file, but may include a variety of other types of audio files. Additionally, the audio data obtained at 302 is exemplarily a mono audio file; however, it is to be recognized that in other embodiments, the audio data may be stereo audio. In still further embodiments, the audio data may be streaming audio data received in real-time or near real-time. The method 300 may also be implemented in embodiments where the audio data obtained at 302 is previously recorded and stored. The audio data may be initially processed in order to segment the audio data into a plurality of overlapping segments. In a non-limiting example, the audio data may be segmented into 20-25 ms segments taken every 10 ms.

The segmented audio data undergoes a decoding process at 304 in order to produce a transcription at 306. In an exemplary embodiment, the decoding process at 304 is a large vocabulary continuous speech recognition (LVCSR) decoding. In a non-limiting embodiment, the LVCSR may be performed using the Viterbi algorithm to apply one or more models to the audio data in order to arrive at the best or most likely transcription of the audio data. In a non-limiting embodiment, the Viterbi algorithm applies at least a linguistic model 308 in the decoding process at 304.

A linguistic model such as the one used at 308 is exemplarily a dictionary of words combined with statistics on the frequency of occurrences of the words in the dictionary as well as statistics on the frequency of the words in the dictionary in relation to other adjacent words. More specifically, the linguistic model may provide statistics, distributions, and/or frequencies of specific word pairs or word triplets. While a generic linguistic model may simply be based upon generalized each patterns and word occurrences, linguistic models can be much more effective when contextual assumptions are made that match the content of the audio data to be transcribed. Therefore, linguistic models can be more effective at decoding specialized audio data when the models are specifically developed to transcribe audio data with technical or specific vocabularies, e.g. medical or legal audio data. Linguistic models can also include scripts or other known sequences of words that are commonly occurring the context of the obtained audio data. Models may also be produced using automated of machine learning techniques.

The transcription produced at 306 is exemplarily a text file of the best or most probable sequence of words based upon the application of the percentages and statistics of the linguistic model to the audio data in the decoding process 304. At 310 text file of the transcription 306 is zoned into segments or meaning units as will be described in further detail herein. In an embodiment, the zoning at 310 applies both an acoustic model 312 and a linguistic model 314. In one embodiment, the linguistic model applied at 314 is the same linguistic model as applied at 308 in the decoding process at 304. However, in other embodiments, an alternative linguistic model is used at 314.

The output of the zoning at 310 is a sequence of meaning units at 316. In a merely exemplary embodiment, a meaning unit may be a segment of twenty or fewer words that are likely to be spoken by the same speaker and contextually related. These meaning units at 316 are well-suited for the application of speech analytics at 318. In the speech analytics at 318, a variety of analyses may be performed in order to identify context, content, or other information from the transcribed audio data. In embodiments as disclosed in further detail herein, the meaning units segmented by the zoning process at 310 strike a desirable balance while avoiding too long the of phrases which make the identification of repetitive patterns difficult, while also avoiding too short of phrases which may not provide enough context, content, or meaning for effective analytics.

Figure 1:
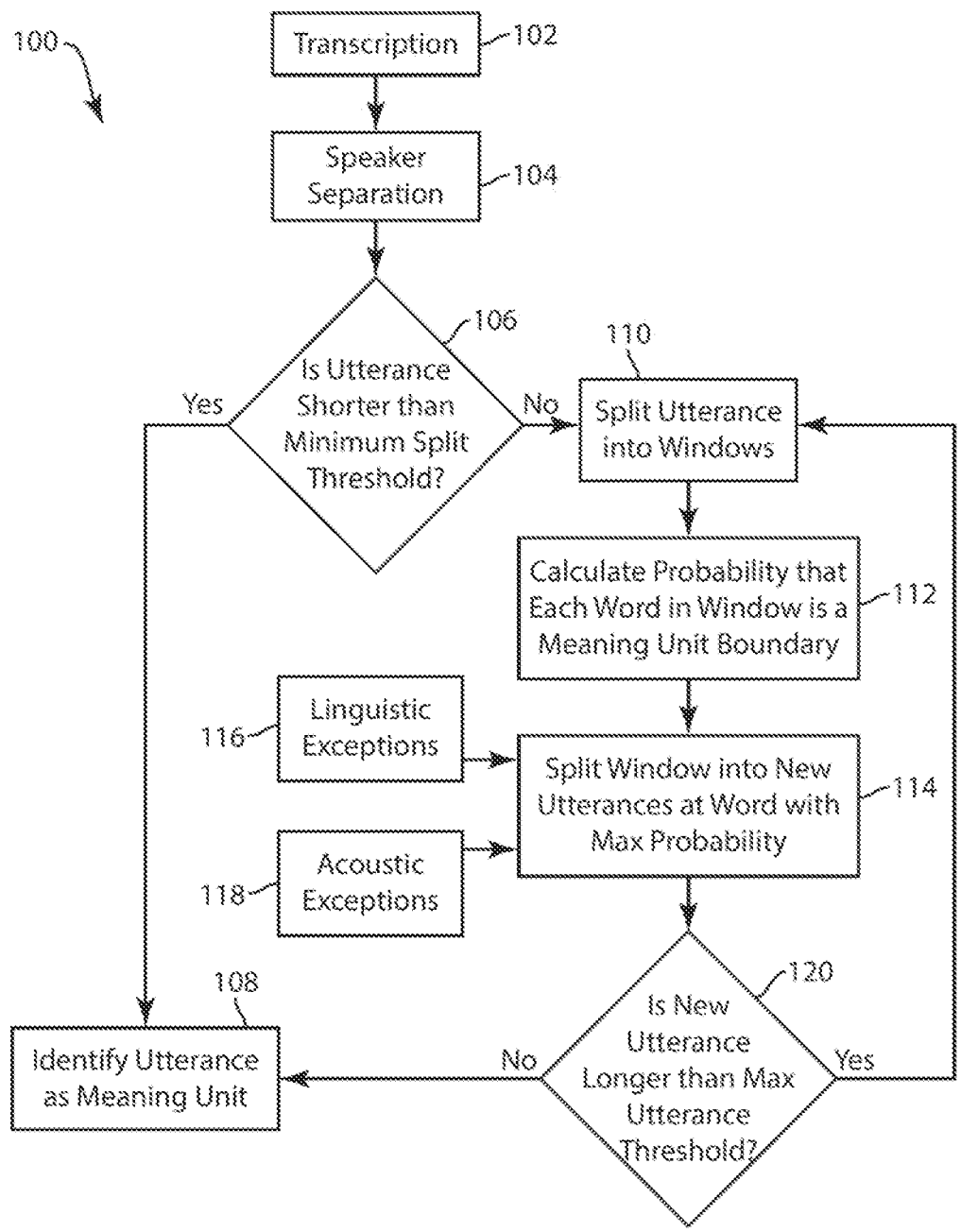
FIG. 1 is a flow chart that depicts an exemplary embodiment of a method of textual zoning.
Figure 2:
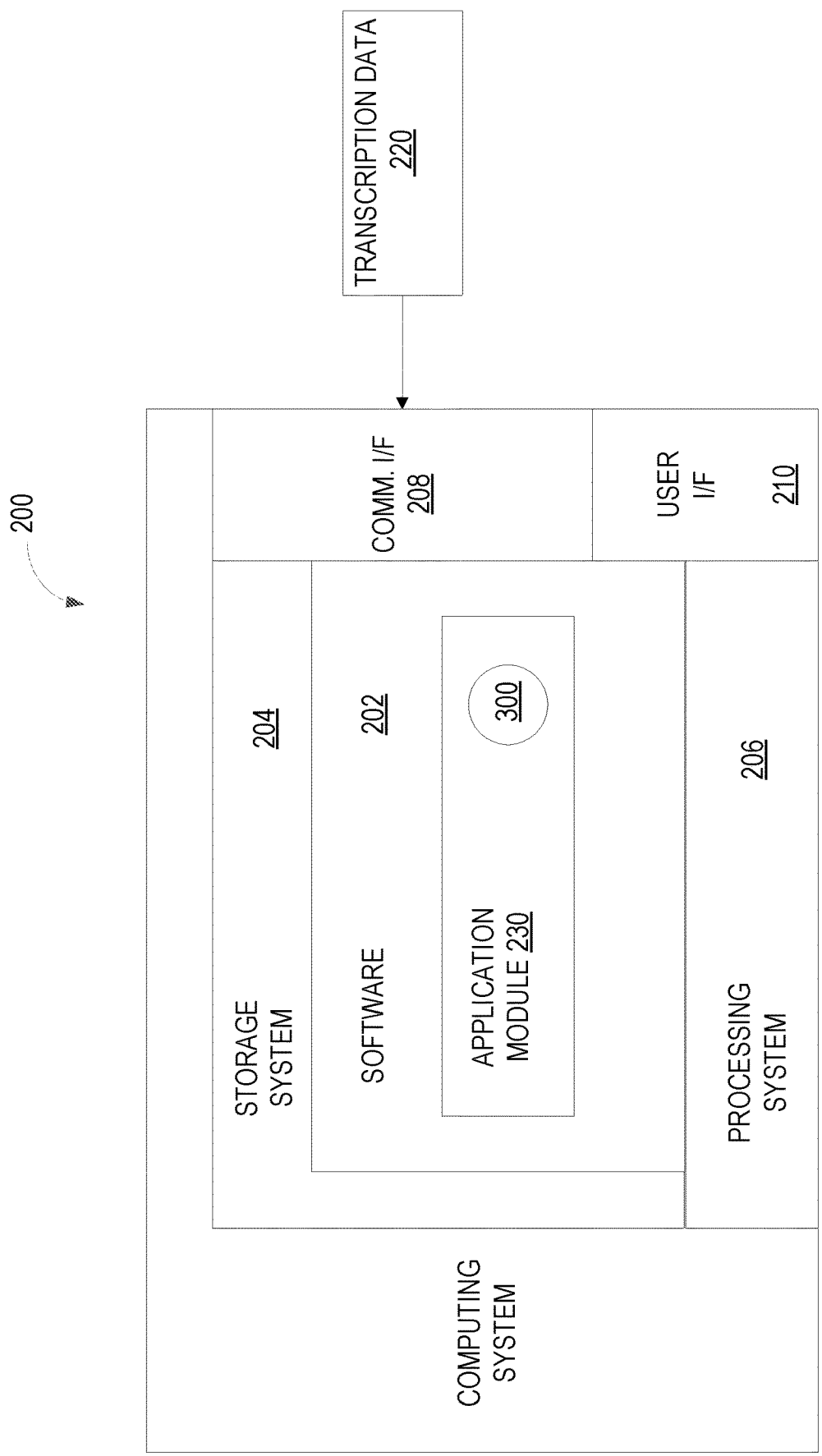
FIG. 2 is a system diagram of an exemplary embodiment of a system for performing textual zoning.

FIG. 1 is a flow chart that depicts an exemplary embodiment of a method 100 of textual zoning. FIG. 2 is a system diagram of an exemplary embodiment of a system 200 for textual zoning. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described herein in further detail in accordance with the method 100. It is to be recognized that in embodiments, the computing system 200 may also carry out some or all of the method 300.

Although the computing system 200 as depicted in FIG. 2 includes one software module in the present example, it should be understood that one or more modules could provide the same operation. Similarly, while the description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. The processing system 206 can be implemented within a single processing device but can also be distributed across multiple processing devices or sub-systems that cooperate in executing program instructions. Examples of processing system 206 include general-purpose central processing units, application specific processors, and logic devices, as well as any other type of processing device, combinations of processing devices, or variations thereof.

The storage system 204 can comprise any storage medium readable by processing system 206, and capable of storing software 202. The storage system 204 can include volatile and nonvolatile, removable and non-removable media implemented in any method or technology for storage of information, such as computer readable instructions, data structures, program modules, or other data. Storage system 204 can be implemented as a single storage device but may also be implemented across multiple storage devices or subsystems. Storage system 204 can further include additional elements, such as a controller capable of communicating with the processing system 206.

Examples of storage media include a random access memory, read only memory, magnetic disks, optical disks, flash memory, virtual memory, and non-virtual memory, magnetic sets, magnetic tape, magnetic disk storage or other magnetic storage devices, or any other medium which can be used to store the desired information and that may be accessed by an instruction execution system, as well as any combination or variation thereof, or any other type of storage medium.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display and interface further associated with embodiments of the system and method as disclosed herein. The speakers, printers, haptic devices, and other types of output devices may also be included in the user interface 210.

As described in further detail herein, the computing system 200 receives audio data 220 at the communication interface 208. In embodiments, the communication interface 208 operates to send and/or receive data from other devices to which the computing system 200 is communicatively connected. The audio data 220 may be an audio recording or a conversation, which may exemplarily be between two speakers, although the audio recording may be any of a variety of other audio records, including multiple speakers, a single speaker, or an automated or recorded auditory message. The audio data may exemplarily be a .wav format, but may also be other types of audio formats, exemplarily in a pulse code modulated (PCM) format and a further example may include linear pulse code modulated (LPCM) audio data. Furthermore, the audio data is exemplarily mono audio; however, it is recognized that embodiments of the method as disclosed herein may also be used with stereo audio data. In still further embodiments, the audio data may be streaming audio data received in real-time or near real-time by the computing system 200. In an exemplary embodiment as reference herein the audio data may be of a customer service interaction, exemplarily between a customer service agent and a customer although it will be recognized that embodiment as disclosed herein may be used in other functions and contexts.

FIG. 1 is a flow chart that depicts an exemplary embodiment of a method 100 of textual zoning. The method 100 begins at 102 with a transcription such as described above with respect to FIG. 3. In an exemplary embodiment, the transcription 102 is obtained by an LVCSR transcription of audio data.

In examples as disclosed herein, utterances are consecutive sequences of words spoken by one speaker in a conversation without interference by another speaker or another event. Meaning units divide utterances into a basic segment of meaning or the equivalent of a sentence, when narrated text is compared to written text. A meaning unit may be a sequence of words spoken by one speaker in a conversation without interference. In some embodiments, the meaning unit may include some level of speaker interference, e.g. very short acknowledgement statements by the other speaker. All terms in the meaning unit are linked within the boundaries of the meaning unit. A call segment is a set of utterances within a call, usually consecutive utterances, that are related to a specific topic. Non-limiting examples of call segments may include, call beginning, customer detail verification, call reason, problem description, problem resolution, and call finalization. A dialog act is related to a call segment in that the dialog act indicates some intention of the speaker or denotes a function or purpose of an utterance or meeting unit within the customer service interaction. Non-limiting examples of dialog acts may include an identification whether a utterance/meaning unit is a statement, question, greeting, or such. In some embodiments, a category or a user defined labeled predicate is assigned to the data file exemplarily by the customer service agent to identify a domain of the customer service interaction. In an alternative embodiment, the category may be determined through the application of rules that are expressed as a query language using logical operators on variables (text) extracted from the call.

At 104, the transcription undergoes a speaker separation in which the transcription is divided into utterances. An utterance is a relatively short grouping of words that have a high probability to have been spoken by the same speaker. In one embodiment, the speaker separation at 104 may be performed by applying an acoustic model to the audio data processed to obtain the transcription. Alternatively, the entropy of the audio data can be evaluated to separate speakers. These analyses can identify pauses or breaks in the audio data that may correspond a change between speakers. In an alternative embodiment the speaker separation can be achieved by applying a linguistic model to the transcription. The application of the linguistic model to the transcription can use probabilities found in the linguistic model that identify when groupings of words are likely to have emanated from the same speaker. In a still further embodiment a combination of acoustic, entropal, and linguistic analysis is used to achieve speaker separation. In a still further embodiment, if the audio data is of an interaction between two or more people and at least one of the speakers in the conversation is known, then the identified utterances can be attributed to one of the speakers of the known two or more speakers in a process known as diarization.

At 106, each of the utterances is evaluated based upon length. If an utterance is shorter than a predetermined threshold number of words, then the utterance is identified at 108 as a meaning unit. In an embodiment, the predetermined threshold is two times a minimum utterance length for splitting into two meaning units. In an exemplary embodiment, the minimum utterance length for splitting into meaning units may be fifteen words and therefore the predetermined threshold number of words is thirty words. Therefore, at 106 if the utterance is less than thirty words, then this utterance is identified at 108 as a meaning unit. If the utterance is longer than the predetermined threshold number of words, then the utterance as a whole is deemed to contain more than one meaning unit and therefore the utterance must be optimally subdivided as disclosed herein in order to automatedly extract the meaning units from the utterance.

The utterances that are determined at 106 to be longer than the predetermined threshold number of words may be further split into windows at 110. Since words that are far apart tend to be less correlated, an utterance may be split into a window of a predetermined word length. In an exemplary embodiment, the predetermined word length may be two times a predetermined maximum utterance size. In such an embodiment, the window is therefore ensured not to require that more than two utterances must be identified within the window, although in accordance with the processing disclosed herein a window may be eventually divided in to two or more utterances. In a merely exemplary embodiment, the maximum utterance size may be twenty words. The splitting of the along utterance into windows serves the purpose of simplifying the calculation and analysis, and also helps to obtain more accurate identification of meaning unit boundaries within the long utterance.

At 112 for each word in a window, a percentage or probability that that word is a meaning unit boundary is calculated. This can be performed by applying a linguistic model to the transcription. In an embodiment, the linguistic model is an N-gram linguistic model which contains the probability of words to appear before and/or after words (Wi) or markers of the beginning or the end of an utterance ($<s>$, $</s>$). In an exemplary embodiment, the linguistic model applied at 112 may be the same linguistic model as used to obtain the transcription at 102 of the audio data. It will also be recognized that the linguistic models used at 112 and 102 may also be different models in an alternative embodiment.

In the linguistic model, the model may provide linguistic statistics and probabilities that particular words signal or indicate a change of a speaker or a change in a meaning unit. As an example, "wh" question words (e.g. who, what, where, why, when) tend to start the beginning of a sentence which is likely to either be the beginning of a new speaker or indicate the start of a new meaning unit. Other non-limiting examples of such meaning unit boundary words may include "so" or "and."

In addition to including probabilities related to individual words as indicating the start of a new meaning unit, the linguistic model may also provide probabilities as to the likelihood that short combinations of words. These probabilities may exemplarily include probabilities that word doublets or triplets are spoken together within a single meaning unit as opposed to emanating from separate speakers or separate meaning units. In a non-limiting example, short phrases such as "now what" or "guess what" include a "wh" question word as described above as having a high likelihood of indicating a new meaning unit; however, the statistics in the linguistic model may show that when the word "what" is found in a doublet of either of these combinations, then the "what" in either of these doublets does not start a new meaning unit.

For each window with the words $W_1 \ldots W_N$ a probability is calculated that the phrase has no meaning unit boundary: $P(\text{baseline}) = P(W_1 \ldots W_N)/N$. Additionally, the probability that a meaning unit boundary appears after each word ($W_k$) in the window is calculated as follows:

$$P(k \text{ is } MU \text{ boundary}) = P(W_1 \ldots W_k \langle /s \rangle \langle s \rangle W_{k+1} \ldots W_N/(N+2)$$
$$= 0$$

If k>MIN_MU_SPLIT and k<N−MIN_MU_SPLIT Otherwise.

At 114, the window is split into meaning units at the word determined to have the maximum probability that the word is the meaning unit boundary as calculated above. This determination is, however, subject to one or more exceptions or exclusions which may exemplarily be defined as linguistic exceptions at 116 or acoustic exceptions at 118. The following are exemplary linguistic exceptions as may be used in an embodiment of the method as disclosed herein:

$P(k$ is $MU$ boundary)>MIN_BOUNDARY_PROBABILITY $P(k$ is $MU$ boundary)−$P$(baseline)>MIN_PROBABILITY_DIFF An example of an acoustic exception 118 may be the identification of long pauses in speech. Such an acoustical analysis may require analysis of the audio data that was processed to result in the original transcription at 102. For example, a break of longer than 200 ms in the audio data may be an independent cue, apart from the linguistic and textual analysis as described above indicative of a new meaning unit. Long pauses in speech may exemplarily reflect the speaker taking punctuation which can likely form a meaning unit boundary, or the long pause can indicate the transition between speakers. On the other hand, a speaker may take a pause in the speech as the speaker gathers further thoughts within the same meaning unit. Therefore, in an embodiment it is desirable to conduct linguistic analysis surrounding the doublets or triplets of words separated by the pause in the speech. The following is an exemplary acoustic exception as described above which may be used in an embodiment of the method as disclosed herein:

ratioScore($W_k$)=$P(W_{k-2}W_{k-1}$</s>)*$P$(<s>$W_k$)/$P(W_{k-2}W_{k-1}W_k$)

ratioScore($W_k$)<MIN_PAUSE_RSCORE if $W_k$ is a silence as returned by the transcription engine or ratioScore($W_k$)<MIN_GENERAL_RSCORE otherwise.

In the above example, ratio score ($W_k$) is a measure of how related a word ($W_k$) is to its left context. If $W_k$ is a pause then we compare the next term to the right of the $k^{th}$ position $W_{k+1}$ with $W_{k-2}$ $W_{k-1}$ conversely if any of $W_{k-2}$ $W_{k-1}$ is a pause we look to the next term to the left of $W_k$ in a merely exemplary embodiment, the following values may be used: MAX_UTT_SIZE=20; MIN_UTT_SIZE=4; MIN_UTT_FOR_SPLIT=15; MIN_MU_SPLIT=4; MIN_PROB=−6; MIN_PAUSE_LEN=60; MIN_PROBABILITY_DIFF=0.15; MIN_BOUNDARY_PROBABILITY=2.05; MIN_PAUSE_RSSCORE=0.0; MIN_GENERAL_RSCORE=0.75

If the identified word, $W_k$, is confirmed to be the boundary of the meaning unit then the window is split into two resulting utterances $W_1$ ... $W_k$ and $W_{k+1}$ ... $W_N$. Each of the newly identified utterances from 114 is evaluated at 120 to determine if the meaning unit is a longer than a maximum meaning unit threshold. If an utterance is not longer than a maximum meaning unit threshold, then the utterance is identified at 108 as a meaning unit. If the utterance is identified as being a longer than a maximum meaning unit threshold at 120, then the steps 110-120 are repeated in order to further identify meaning units within the utterance. In an alternative embodiment, rather than the comparing the utterance length to a maximum meaning unit threshold, the utterance length may be compared to a minimum utterance length for splitting.

The method 100 is repeated until all of the transcription has been divided into meaning units. The division of the transcription into meaning units can assist with improving the quality of the analysis achieved by speech analytics. In speech analytics, the already identified meeting units can form the basis for further high-level analysis, such as identifying themes within the transcription, flow within the transcription, or relations between meeting units in the transcription.

In a non-limiting embodiment, relations within the transcription may be combinations of closely spaced words that convey an idea. As an example, a relation may be [action, object] such as [pay, bill]. With the meaning units already automatically identified, the speech analytics can search for a relation specifically with in a meaning unit, or specific meeting units, rather than across the entire transcription.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of performing speech analytics, the method comprising:
    producing a set of meaning units by zoning a digital transcript file of audio data, wherein the zoning comprises:
        identifying a plurality of utterances within the digital transcript file representing audio data, the identifying performed by applying an acoustic model to the audio data or a linguistic model to the digital transcript file;
        for each utterance having fewer than a predetermined number of words, defining the utterance as a meaning unit for the set of meaning units;
        for each utterance having more than a predetermined number of words, defining the utterance as comprising more than one meaning unit and parsing data associated with the utterance into data windows of predetermined length of N words for determination of a meaning unit boundary within the utterance; and
        for each data window, for each word $W_{1\ldots N}$ within each data window, calculating a probability and entropy that the each word $W_{1\ldots N}$ is the meaning unit boundary by applying another n-gram linguistic model to the data window, the probability and the entropy indicative of words indicative of a change in speaker, words appearing before or after a particular word, word doublets or triplets are spoken together, or a likelihood of a short combination or words;

splitting each data window into meaning units at a word $W_k$ having a maximum calculated probability of being the meaning unit boundary, such that each meaning unit includes the word $W_k$ having the highest probability indicating a new meaning unit; and applying automated speech analytics to the set of meaning units.

2. The method of claim 1, wherein the linguistic model calculates probabilities to identify when groupings of words are likely to have emanated from the same speaker.

3. The method of claim 1, further comprising decoding overlapping temporal audio segments using a language model to produce the digital transcript file of the audio data.

4. The method of claim 1, wherein the zoning further includes calculating an entropy of the audio data.

5. The method of claim 1, the zoning further comprising applying a linguistic model to identify words with a high probability of indicating a change of meaning unit.

6. The method of claim 5, wherein the words with a high probability of indicating a change of meaning unit include words starting with letters "wh".

7. The method of claim 1, further comprising constructing a consecutive sequence of meaning units by incorporating the meaning units and additional meaning units in temporal series prior to applying automated speech analytics to the set of meaning units.

8. A non-transitory computer readable medium comprising instructions that, when executed by a processor of a processing system, cause the processing system to perform a method, the method comprising:

produce a set of meaning units by zoning a digital transcript file of audio data, wherein the instructions to produce the set of meaning units further cause the processing system to:

identify a plurality of utterances within the digital transcript file representing audio data, performed by applying an acoustic model to the audio data or a linguistic model to the digital transcript file;

for each utterance having fewer than a predetermined number of words, define the utterance as a meaning unit for the set of meaning units;

for each utterance having more than a predetermined number of words, define the utterance as comprising more than one meaning unit and parse data associated with the utterance into data windows of predetermined length of N words for determination of a meaning unit boundary within the utterance; and for each data window, for each word $W_{1\ldots N}$ within each data window, calculate a probability and entropy that the each word $W_{1\ldots N}$ is the meaning unit boundary by applying another n-gram linguistic model to the data window, the probability and the entropy indicative of words indicative of a change in speaker, words appearing before or after a particular word, word doublets or triplets are spoken together, or a likelihood of a short combination or words;

split each data window into meaning units at a word $W_k$ having a maximum calculated probability of being the meaning unit boundary, such that each meaning unit includes the word $W_k$ having the highest probability indicating a new meaning unit; and apply automated speech analytics to the set of meaning units.

9. The non-transitory computer readable medium of claim 8, wherein the linguistic model calculates probabilities to identify when groupings of words are likely to have emanated from the same speaker.

10. The non-transitory computer readable medium of claim 8, wherein the instructions further cause the processing system to decode overlapping temporal audio segments using a language model to produce the digital transcript file of the audio data.

11. The non-transitory computer readable medium of claim 8, wherein the instructions further cause the processing system to zone the digital transcript file and to calculate an entropy of the audio data.

12. The non-transitory computer readable medium of claim 8, wherein the instructions further cause the processing system to zone the digital transcript file and to identify words with a high probability of indicating a change of meaning unit.

13. The non-transitory computer readable medium of claim 12, wherein the words with a high probability of indicating a change of meaning unit include words starting with letters "wh".

14. The non-transitory computer readable medium of claim 8, wherein the instructions further cause the processing system to construct a consecutive sequence of meaning units by incorporating the meaning units and additional meaning units in temporal series prior to applying automated speech analytics to the set of meaning units.

15. A system for performing speech analytics, comprising:
a memory comprising executable instructions;
a processor configured to execute the executable instructions and cause the system to:

produce a set of meaning units by zoning a digital transcript file of audio data, wherein the instructions to produce the set of meaning units further cause the system to:

identify a plurality of utterances within the digital transcript file representing audio data, performed by applying an acoustic model to the audio data or a linguistic model to the digital transcript file;

for each utterance having fewer than a predetermined number of words, define the utterance as a meaning unit for the set of meaning units;

for each utterance having more than a predetermined number of words, define the utterance as comprising more than one meaning unit and parse data associated with the utterance into data windows of predetermined length of N words for determination of a meaning unit boundary within the utterance; and for each data window, for each word $W_{1\ldots N}$ within each data window, calculate a probability and entropy that the each word $W_{1\ldots N}$ is the meaning unit boundary by applying another n-gram linguistic model to the data window, the probability and the entropy indicative of words indicative of a change in speaker, words appearing before or after a particular word, word doublets or triplets are spoken together, or a likelihood of a short combination or words;

split each data window into meaning units at a word $W_k$ having a maximum calculated probability of being the meaning unit boundary, such that each meaning unit includes the word $W_k$ having the highest probability indicating a new meaning unit; and apply automated speech analytics to the set of meaning units.

16. The system of claim 15, wherein the linguistic model calculates probabilities to identify when groupings of words are likely to have emanated from the same speaker.

17. The system of claim 15, wherein the instructions further cause the system to decode overlapping temporal audio segments using a language model to produce the digital transcript file of the audio data.

18. The system of claim 15, wherein the instructions further cause the system to zone the digital transcript file and to calculate an entropy of the audio data.

19. The system of claim 15, the instructions further comprise instructions to the zone the digital transcript file and to apply a linguistic model to identify words with a high probability of indicating a change of meaning unit.

20. The system of claim 19, wherein the words with a high probability of indicating a change of meaning unit include words starting with letters "wh".

21. The system of claim 15, wherein the instructions wherein the instructions further cause the system to construct a consecutive sequence of meaning units by incorporating the meaning units and additional meaning units in temporal series prior to applying automated speech analytics to the set of meaning units.

22. The method of claim 1, wherein each data window is twice the predetermined threshold.

23. The non-transitory computer readable medium of claim 8, wherein each data window is twice the predetermined threshold.

24. The system of claim 15, wherein each data window is twice the predetermined threshold.

* * * * *